United States Patent
Lu et al.

(10) Patent No.: US 12,177,819 B2
(45) Date of Patent: Dec. 24, 2024

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 408 days.

(21) Appl. No.: 17/649,224

(22) Filed: Jan. 28, 2022

(65) Prior Publication Data
US 2022/0183005 A1    Jun. 9, 2022

Related U.S. Application Data (63) Continuation of application No. PCT/CN2019/098817, filed on Aug. 1, 2019.

(51) Int. Cl.
*H04W 72/0446* (2023.01)
*H04W 72/56* (2023.01)

(52) U.S. Cl.
CPC ....... *H04W 72/0446* (2013.01); *H04W 72/56* (2023.01)

(58) Field of Classification Search
CPC ........................... H04W 72/0446; H04W 72/56
(Continued)

(56) References Cited

U.S. PATENT DOCUMENTS

| | | | |
|---|---|---|---|
| 2019/0045345 A1 | 2/2019 | Lee et al. | |
| 2021/0037549 A1* | 2/2021 | Akkarakaran | H04W 28/04 |

FOREIGN PATENT DOCUMENTS

| | | |
|---|---|---|
| CN | 108282278 A | 7/2018 |
| JP | 2018078627 A | 5/2018 |

(Continued)

OTHER PUBLICATIONS

Examination Report for European Application No. 19940137.3 issued Feb. 22, 2023. 5 pages.
(Continued)

*Primary Examiner* — Sibte H Bukhari
(74) *Attorney, Agent, or Firm* — PERKINS COIE LLP (57) ABSTRACT

Implementations of the present application provide a wireless communication method and a terminal device, which can avoid a communication conflict between a side link and an uplink and a downlink, thereby improving the communication performance on the side link and the uplink and the downlink. The wireless communication method comprises: a first terminal device receiving first information sent by a second terminal device, wherein the first information is used to indicate first resources and/or second resources, the first resources are resources used by the second terminal device to perform cellular communication, and the second resources are resources used by the second terminal device to perform sidelink communication with a third terminal device; and the first terminal device performing, on resources other than the resources indicated by the first information, sidelink communication with the second terminal device.

13 Claims, 5 Drawing Sheets

(58) Field of Classification Search
USPC .......................................................... 370/336
See application file for complete search history.

(56) References Cited

FOREIGN PATENT DOCUMENTS

| WO | 2016147235 | A1 | | 9/2016 | |
|----|------------|-----|---|--------|----------|
| WO | WO-2018074876 | A1 | * | 4/2018 | .............. H04W 4/40 |
| WO | 2019031085 | A1 | | 2/2019 | |

OTHER PUBLICATIONS

Decision of Grant for Japanese Application No. 2022-505642 Issued Nov. 21, 2023, 6 Pages with English Translation.
Third examination report for European Application No. 19940137.3 Issued Dec. 11, 2023, 6 Pages.
Spreadtrum Communications, Discussion on resource allocation conflict for sidelink one-to-one communication, 3GPP TSG-RAN WG2 Meeting #94, R2-163408, Nanjing, May 23-27, 2016.
ZTE, Discussion on conflicts between PC5 and Uu, 3GPP TSG RAN WG1 Meeting #90, R1-1712917, Prague, Czech Republic, Aug. 21-25, 2017.
International Search Report mailed Apr. 24, 2020 in Application No. PCT/CN2019/098817.
OPPO, Left issues on MAC for NR / V2X, 3GPP TSG RAN WG2 #106. Reno, US, May 13-May 17, 2019.R2-1908074, 8 pages.
Examination Report of European application No. 19940137.3 issued on Jul. 5, 2023, 6 pages.
Notice of Reasons for Refusal of Japanese application No. 2022-505642 issued on Jul. 7, 2023, 10 pages.
Ericsson "Direct Discovery Transmission on Non-Serving Carriers" R1-153348; 3GPP TSG RAN WG1 Meeting #81; Fukuoka, Japan; May 25-29, 2015. 4 pages.
Extended European Search Report for European Application No. 19940137.3 issued May 27, 2022. 12 pages.
LG Electronics "New WID on NR sidelink enhancement" RP-193257; 3GPP TSG RAN Meeting #86; Sitges, Spain; Dec. 9-12, 2019. 6 pages.
LG Electronics "Status Report to TSG: 5G V2X with NR sidelink" RP-190983; 3GPP TSG RAN Meeting #84; Newport Beach, USA; Jun. 3-6, 2019. 38 pages.
LG Electronics Inc. "Discussion on assistance information for resource allocation in NR SL" R2-1907857; 3GPP TSG RAN WG2 Meeting #106; Reno, USA; May 13-17, 2019. 3 pages.
Fourth Office Action of the EP application No. 19940137.3, issued on Jun. 19, 2024. 9 pages.
First Office Action of the CN application No. 201980093431.8, issued on Apr. 30, 2024. 14 pages with English translation.
Second Office Action of the CN application No. 201980093431.8, issued on Jul. 10, 2024. 9 pages with English translation.

* cited by examiner

| S210 | A first terminal device receives first information sent by a second terminal device, wherein the first information is used for indicating a first resource and/or a second resource, the first resource is a resource used by the second terminal device for performing cellular communication, and the second resource is a resource used by the second terminal device for performing sidelink communication with a third terminal device |

| S220 | The first terminal device performs the sidelink communication with the second terminal device on a resource other than a resource indicated by the first information |

WIRELESS COMMUNICATION METHOD AND TERMINAL DEVICE

CROSS-REFERENCE TO RELATED APPLICATIONS

The present application is a continuation application of International PCT Application No. PCT/CN2019/098817, having an international filing date of Aug. 1, 2019, the contents of the above-identified application is hereby incorporated by reference.

TECHNICAL FIELD

Implementations of the present application relate to the field of communication, and more particularly, to a wireless communication method and a terminal device.

BACKGROUND

A terminal device (e.g., a Vehicle User Equipment (VUE)) may communicate with another terminal on a sidelink, and may communicate with a network device on an uplink and a downlink. However, there may be a conflict between communication of the terminal device on the sidelink and communication of the terminal device on the uplink and the downlink, thus affecting communication performance How to avoid a communication conflict between the sidelink, and the uplink and the downlink is a problem to be solved urgently.

SUMMARY

Implementations of the present application provide a wireless communication method and a terminal device, which can avoid a communication conflict between a sidelink and an uplink or a downlink, thereby improving communication performance on the sidelink, the uplink and the downlink.

In a first aspect, a wireless communication method is provided, which includes: receiving, by a first terminal device, first information sent by a second terminal device, herein the first information is used for indicating a first resource and/or a second resource, the first resource is a resource used by the second terminal device for performing cellular communication, and the second resource is a resource used by the second terminal device for performing sidelink communication with a third terminal device; and performing, by the first terminal device, sidelink communication with the second terminal device on a resource other than the resource indicated by the first information.

In a second aspect, a wireless communication method is provided, which includes: performing, by a first terminal device, communication according to a first priority order in a case where there is a conflict between sidelink communication between the first terminal device and a second terminal device, and cellular communication between the first terminal device and a first network device, herein the first priority order is determined according to service attributes and/or resource attributes.

In a third aspect, a terminal device is provided, which is configured to perform the method in the first aspect described above or various implementation modes thereof.

Specifically, the terminal device includes function modules configured to perform the method in the first aspect described above or various implementation modes thereof.

In a fourth aspect, a terminal device is provided, which is configured to perform the method in the second aspect described above or various implementation modes thereof.

Specifically, the terminal device includes function modules configured to perform the method in the second aspect described above or various implementation modes thereof.

In a fifth aspect, a terminal device is provided, which includes a processor and a memory. The memory is configured to store a computer program, and the processor is configured to call and run the computer program stored in the memory to perform the method in the first aspect described above or various implementation modes thereof.

In a sixth aspect, a terminal device is provided, which includes a processor and a memory. The memory is configured to store a computer program, and the processor is configured to call and run the computer program stored in the memory to perform the method in the second aspect described above or various implementation modes thereof.

In a seventh aspect, an apparatus is provided, which is configured to implement the method in any one of the first to second aspects described above or various implementation modes thereof.

Specifically, the apparatus includes a processor configured to call and run a computer program from a memory to enable a device in which the apparatus is installed to perform the method in any one of the first to second aspects described above or various implementation modes thereof.

In an eighth aspect, a computer readable storage medium is provided, which is configured to store a computer program that enables a computer to perform the method in any one of the first and second aspects described above or various implementation modes thereof.

In a ninth aspect, a computer program product is provided, which includes computer program instructions that enable a computer to perform the method in any one of the first to second aspects described above or various implementation modes thereof.

In a tenth aspect, a computer program is provided, wherein when the computer program is run on a computer, the computer program enables a computer to perform the method in any one of the first and second aspects described above or various implementation modes thereof.

According to a technical solution described in the first aspect above, a first terminal device is made aware of a resource used by a second terminal device for performing cellular communication, and/or a resource used by the second terminal device for performing sidelink communication with a third terminal device, and the first terminal device avoids performing sidelink communication with the second terminal device on these resources, thereby reducing a conflict between the cellular communication and the sidelink communication of the second terminal device, and further being beneficial to achieving power saving of the second terminal device.

According to a technical solution described in the second aspect above, in a case where there is a conflict between sidelink communication between a first terminal device and a second terminal device, and cellular communication between the first terminal device and a first network device, the first terminal device performs communication according to the first priority order. Since the first priority order is determined according to the service attributes and/or the resource attributes, the first terminal device may flexibly select a service for transmission based on the service attributes and/or resource attributes, so that discontinuous transmission may be performed on a sidelink, an uplink and a downlink, which is beneficial to achieving power saving of the first terminal device.

DETAILED DESCRIPTION

Technical solutions in the implementations of the present application will be described below with reference to accompanying drawings in the implementations of the present application. It is apparent that the implementations described are merely a part of the implementations of the present application, rather than all of the implementations of the present application. According to the implementations of the present application, all other implementations achieved by a person of ordinary skills in the art without paying inventive efforts shall be covered by the protection scope of the present application.

Implementations of the present application may be applied to any communication architecture for terminal device-to-terminal devices.

For example, Vehicle to Vehicle (V2V), Vehicle to Everything (V2X), and Device to Device (D2D).

A terminal in an implementation of the present application may be any device or apparatus configured with a physical layer and a media access control layer, and a terminal device may also be called an access terminal. For example, the terminal device may refer to a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another linear processing device connected to a wireless modem, a vehicle-mounted device, a wearable device, or the like. The implementations of the present application are described by taking a Vehicle User Equipment (VUE) as an example, but are not limited thereto.

Optionally, in some implementations of the present application, the implementations of the present application may be applied to the 3rd Generation Partnership Project (3GPP), in which two transmission modes are defined, denoted as a mode A and a mode B respectively.

Figure 1:
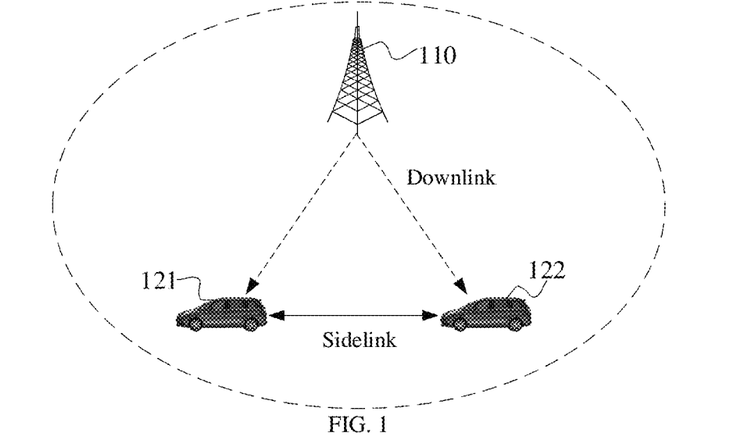
FIG. 1 is a schematic diagram of architecture of a transmission mode according to an implementation of the present application.
Figure 2:
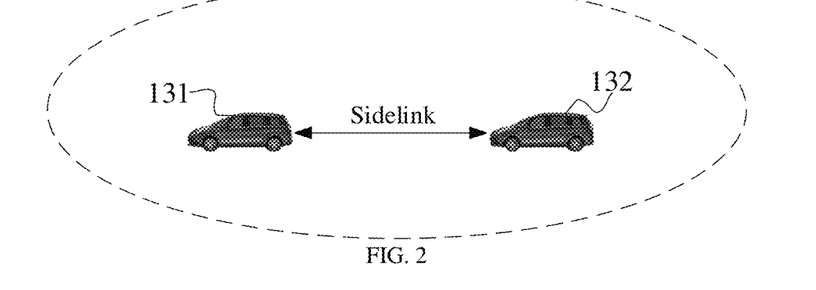
FIG. 2 is a schematic diagram of architecture of another transmission mode according to an implementation of the present application.

FIG. 1 is a schematic diagram of the mode A according to an implementation of the present application. FIG. 2 is a schematic diagram of the mode B according to an implementation of the present application.

In the mode A shown in FIG. 1, transmission resources of VUEs (a VUE 121 and a VUE 122) are allocated by a base station 110, and the VUEs performs data transmission on a sidelink according to the resources allocated by the base station 110. Specifically, the base station 110 may allocate a resource for single transmission to a terminal, or may allocate a resource for semi-static transmission to a terminal.

In the mode B shown in FIG. 2, VUEs (a VUE 131 and a VUE 132) adopt a transmission mode of sensing and reservation, and the VUEs autonomously select transmission resources on resources of a sidelink for data transmission.

The following takes the VUE 131 as an example for a specific description.

The VUE 131 obtains a set of available transmission resources in a resource pool by sensing, and the VUE 131 randomly selects one transmission resource from the set for data transmission.

As services in a vehicle networking system have periodic characteristics, in an implementation of the present application, the VUE 131 may further adopt a semi-static transmission mode. That is, after obtaining one transmission resource, the VUE 131 continuously uses the transmission resource in multiple transmission cycles to reduce probabilities of resource reselection and resource conflict.

The VUE 131 may carry information for reserving a resource for a next transmission in control information of a current transmission, so that another terminal (for example, the VUE 132) may determine whether this resource is reserved and used by a user by detecting control information of the user, thus achieving a purpose of reducing resource conflicts.

It should be noted that in a New Radio (NR) Vehicle to Everything (V2X), a user may be in a mixed mode, that is, the user may use the mode A to obtain a resource, and may use a mode B to obtain a resource at the same time.

At the same time, in the NR V2X, a terminal device is required to perform sending and reception continuously in system design. However, the terminal device continuously performs transmitting and receiving on a sidelink, and reuses transmission/reception capabilities on the sidelink, and an uplink and a downlink, which may lead to a conflict between sidelink communication and paging reception of the terminal device in an idle state, and may also lead to a conflict between the sidelink communication and random access configuration, and may also lead to a conflict between the sidelink communication and downlink Discontinuous Reception (DRX) configuration.

Based on the above technical problems, the present application designs a wireless communication method, which may avoid a conflict between sidelink communication and cellular communication.

Figure 3:
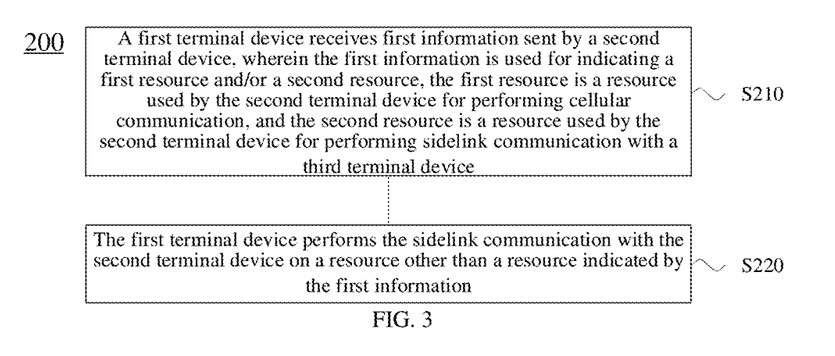
FIG. 3 is a schematic flow chart of a wireless communication method according to an implementation of the present application.

FIG. 3 is a schematic flow chart of a wireless communication method 200 according to an implementation of the present application. The method 200 may be performed by a first terminal device. The first terminal device shown in FIG. 3 may be a VUE shown in FIG. 1 or FIG. 2.

As shown in FIG. 3, the method 200 includes part or all of the following contents.

In S210, a first terminal device receives first information sent by a second terminal device, herein the first information is used for indicating a first resource and/or a second resource, the first resource is a resource used by the second terminal device for cellular communication, and the second resource is a resource used by the second terminal device for performing sidelink communication with a third terminal device.

In S220, the first terminal device performs sidelink communication with the second terminal device on a resource other than the resource indicated by the first information.

It should be noted that the first terminal device performs the sidelink communication with the second terminal device on the resource other than the resource indicated by the first information, which may avoid a conflict between the sidelink communication between the first terminal device and the second terminal device, and cellular communication and/or sidelink communication performed by the second terminal device, thereby being beneficial to power saving of the second terminal device. Of course, in some cases, the sidelink communication between the first terminal device and the second terminal device may also occupy a part of the resource indicated by the first information. For example, in a case of less available resources, the sidelink communication between the first terminal device and the second terminal device may also occupy a part of the resource indicated by the first information. That is, the first terminal device tries to avoid performing the sidelink communication with the second terminal device on the resource indicated by the first information.

That is, in an implementation of the present application, the second terminal device may actively send the first information to the first terminal device, so that the first terminal device may be made aware of the first resource and/or the second resource, so that this part of resource indicated by the first information may be avoided as much as possible when the sidelink communication is performed between the first terminal device and the second terminal device, which may reduce a conflict between the sidelink communication between the first terminal device and the second terminal device, and the cellular communication and/or sidelink communication performed by the second terminal device, thereby being beneficial to power saving of the second terminal device.

Optionally, in an implementation of the present application, the first terminal device may also perform sidelink communication with the second terminal device on a resource other than a third resource, herein the third resource is a resource used by the first terminal device to perform sidelink communication with a fourth terminal device. That is, when the sidelink communication is performed between the first terminal device and the second terminal device, the resource used by the first terminal device for performing sidelink communication with the fourth terminal device may also be avoided, thereby reducing conflicts between sidelink communications between the first terminal device and different terminal devices, and being beneficial to power saving of the first terminal device. Of course, in some cases, the sidelink communication between the first terminal device and the second terminal device may also occupy a part of the third resource. For example, in a case of less available resources, the sidelink communication between the first terminal device and the second terminal device may also occupy a part of the third resource.

Optionally, in an implementation of the present application, the first terminal device sends second information to the second terminal device, herein the second information is used for indicating a resource for the second terminal device to perform sidelink communication with the first terminal device. That is, after receiving the first information, the first terminal device may also indicate the resource for the second terminal device to perform sidelink communication with the first terminal device, so that when the second terminal device performs the sidelink communication with the first terminal device, this part of resource indicated by the first information may be avoided as much as possible, thereby reducing a conflict between the sidelink communication between the first terminal device and the second terminal device and cellular communication and/or sidelink communication performed by the second terminal device.

Optionally, the resource indicated by the second information may be determined according to the resource (the first resource and/or the second resource) indicated by the first information.

Optionally, the resource indicated by the second information may also be determined according to the third resource and the resource (the first resource and/or the second resource) indicated by the first information.

Optionally, the resource indicated by the second information may be configured by a first network device serving the first terminal device.

Specifically, the first terminal device sends third information to the first network device, herein the third information is used for indicating the resource indicated by the first information; the first terminal device receives fourth information sent by the first network device, herein the fourth information is used for indicating resource information used by the first terminal device and/or the second terminal device for performing sidelink communication.

It should be noted that the first terminal device may determine the second information based on the fourth information. That is, resource information of sidelink communication indicated by the second information may be configured by the first network device.

Optionally, the fourth information is also used for indicating resource information used by the first terminal device for downlink reception and/or uplink transmission.

Optionally, a resource indicated by the fourth information may be determined according to the resource indicated by the third information.

It should be noted that the implementation of the present application may also be adapted to multicast communication, for example, a sidelink is established between the first terminal device and at least one terminal device.

For example, it is assumed that a UE 1 establishes sidelinks with a UE 2, a UE 3, and a UE 4 respectively. The UE 1 receives information 1 sent by the UE 2, herein the information 1 indicates a resource 1 used by the UE 2 for performing cellular communication and a resource 2 used by the UE 2 for performing sidelink communication with a UE 2'. The UE 1 receives information 2 sent by the UE 3, herein the information 2 indicates a resource 3 used by the UE 3 for performing cellular communication and a resource 4 used by the UE 3 for performing sidelink communication with a UE 3'. The UE 1 receives information 3 sent by the UE 4, herein the information 3 indicates a resource 5 used by the UE 4 for performing cellular communication and a resource 6 used by the UE 4 for performing sidelink communication with a UE 4'. The UE 1 avoids performing sidelink communication with at least one of the UE 2, the UE 3, and the UE 4 on resources indicated by the information 1, resources indicated by the information 2, and resources indicated by the information 3.

Further, the UE 1 may also avoid performing sidelink communication with at least one of the UE 2, the UE 3, and the UE 4 on a resource 7, herein the resource 7 is a resource used by the UE 1 to perform sidelink communication with a UE 1'.

Furthermore, the UE 1 may also send information 4 to the UE 2, herein the information 4 is used for indicating a resource for the UE 2 to perform sidelink communication with the UE 1. The UE 1 may also send information 5 to the UE 3, herein the information 5 is used for indicating a resource for the UE 3 to perform sidelink communication with the UE 1. The UE 1 may also send information 6 to the UE 4, herein the information 6 is used for indicating a resource for the UE 4 to perform sidelink communication with the UE 1.

Optionally, the resource indicated by the information 4, the resource indicated by the information 5, or the resource indicated by the information 6 may be configured by a network device serving the UE 1.

Optionally, in an implementation of the present application, the first terminal device is configured to perform sidelink communication with the second terminal device on a first time domain resource, and the first terminal device is configured to perform cellular communication with the first network device on a second time domain resource.

It should be noted that the first time domain resource should be avoided from overlapping with the second time domain resource in a time domain, so as to avoid a conflict between the cellular communication between the first terminal device and the first network device, and the sidelink communication between the first terminal device and the second terminal device, which is caused by resource selection.

Optionally, as an example, the first time domain resource may include part or all of the resource indicated by the first information, and the second time domain resource may also include part or all of the resource indicated by the first information. However, after obtaining the resource indicated by the first information, the first terminal device performs sidelink communication with the second terminal device on a resource other than the resource indicated by the first information in the first time domain resource, thereby avoiding a conflict between the sidelink communication between the first terminal device and the second terminal device, and the cellular communication and/or sidelink communication performed by the second terminal device, and further achieving power saving of the first terminal device and the second terminal device.

Optionally, as another example, the first time domain resource does not include the resource indicated by the first information, and the first terminal device performs sidelink communication with the second terminal device on the first time domain resource. That is to say, the first terminal device performs sidelink communication with the second terminal device on the first time domain resource, which may avoid a conflict between the sidelink communication between the first terminal device and the second terminal device, and the cellular communication and/or sidelink communication performed by the second terminal device, thereby achieving power saving of the first terminal device and the second terminal device.

It should be noted that the second terminal device may perform sidelink communication with the first terminal device on the first time domain resource, and the second terminal device may perform cellular communication with a second network device on the second time domain resource or on another resource other than the second time domain resource.

Optionally, the first time domain resource and/or the second time domain resource are discontinuous resources in the time domain. That is, the first terminal device may perform discontinuous sidelink communication with the second terminal device on the first time domain resource, and the first terminal device may simultaneously perform discontinuous cellular communication with the first network device on the second time domain resource.

Optionally, in an implementation of the present application, the first time domain resource satisfies at least one of the following conditions:

the first time domain resource is limited to be used for a first logical channel or a logical channel group on a sidelink between the first terminal device and the second terminal device;

the first time domain resource is limited to be used for a first propagation mode;

the first time domain resource is limited to be used for a case that a sidelink between the first terminal device and the second terminal device has not been established; or the first time domain resource is limited to be used for a case that sidelink between the first terminal device and the second terminal device has been established.

Optionally, the first logical channel or logical channel group is a logical channel or logical channel group carrying a signaling, or is a logical channel or logical channel group carrying data.

Optionally, the signaling is a sidelink Radio Resource Control (RRC) signaling or a sidelink PC5 signaling (PC5-S).

For example, in the case that the sidelink between the first terminal device and the second terminal device has not been established, the first logical channel or logical channel group is a logical channel or logical channel group carrying a signaling.

For another example, in the case that the sidelink between the first terminal device and the second terminal device has been established, the first logical channel or logical channel group is a logical channel or logical channel group carrying data.

Optionally, the first propagation mode is broadcast, or the first propagation mode is unicast or multicast.

For example, in the case that the sidelink between the first terminal device and the second terminal device has not been established, the first propagation mode is broadcast.

For another example, in the case that the sidelink between the first terminal device and the second terminal device has been established, the first propagation mode is unicast or multicast.

Optionally, in an implementation of the present application, the second time domain resource is used for reception of a downlink paging message, and/or the second time domain resource is used for sending of an uplink random access message.

Optionally, in an implementation of the present application, the first time domain resource and the second time domain resource may be configured by a network device through a system message, or may be configured by a network device through a downlink signaling.

For example, the first terminal device receives a first system message broadcast by the first network device, herein the first system message includes first indication information and second indication information. The first indication information is used for indicating the first time domain resource and the second indication information is used for indicating the second time domain resource.

For another example, the first terminal device receives a first system message and a second system message broadcast by the first network device, herein the first system message includes first indication information and the second system message includes second indication information. The first indication information is used for indicating the first time domain resource and the second indication information is used for indicating the second time domain resource.

For another example, the first terminal device receives a first downlink signaling sent by the first network device, herein the first downlink signaling includes first indication information and second indication information. The first indication information is used for indicating the first time domain resource and the second indication information is used for indicating the second time domain resource.

The first downlink signaling may be an RRC signaling, for example.

It should be noted that if the first terminal device is in an idle state, that is, an uplink and a downlink between the first terminal device and the first network device have not been established, the first network device may configure the first time domain resource and the second time domain resource by broadcast. If the first terminal device is in a connected state, that is, the uplink and the downlink between the first terminal device and the first network device have been established, the first network device may configure the first time domain resource and the second time domain resource by broadcast or by sending a downlink signaling.

Therefore, in an implementation of the present application, the first terminal device is made aware of a resource used by the second terminal device for performing cellular communication and/or a resource used by the second terminal device for performing sidelink communication with a third terminal device, and the first terminal device avoids performing sidelink communication with the second terminal device on these resources, thus reducing the conflict between the sidelink communication between the first terminal device and the second terminal device, and the cellular communication and/or the sidelink communication performed by the second terminal device, and further being beneficial to power saving of the second terminal device.

Figure 4:
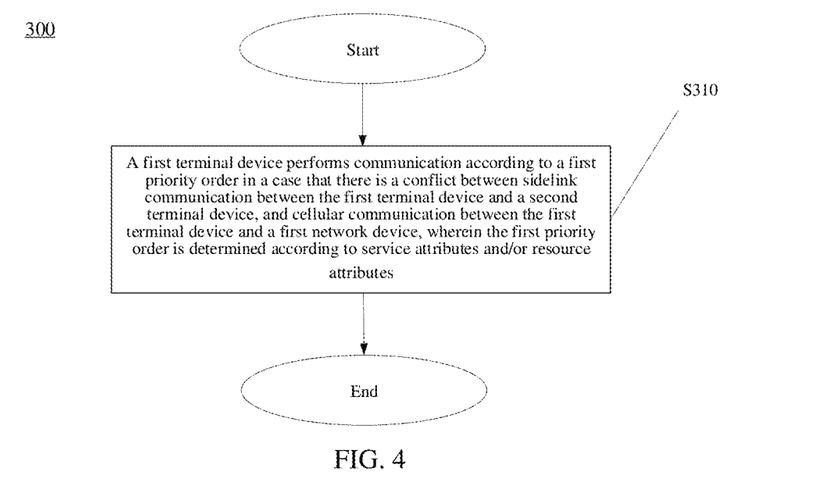
FIG. 4 is a schematic flow chart of another wireless communication method according to an implementation of the present application.

FIG. 4 is a schematic flow chart of a wireless communication method 300 according to an implementation of the present application. The method 300 may be performed by a first terminal device. The first terminal device shown in FIG. 4 may be a VUE shown in FIG. 1 or FIG. 2.

As shown in FIG. 4, the method 300 includes part or all of the following contents.

In S310, a first terminal device performs communication according to a first priority order in a case that there is a conflict between sidelink communication between the first terminal device and a second terminal device, and cellular communication between the first terminal device and a first network device, herein the first priority order is determined according to service attributes and/or resource attributes.

It should be noted that the first network device is a network device serving the first terminal device.

For example, in the first priority order, priorities are A, E, B, C, F, and D from high to low in turn, herein E and F are cellular communication services, and A, B, C, and D are sidelink communication services. That is to say, communication is performed based on the first priority order, and a service may be flexibly selected for transmission based on service attributes, so that discontinuous transmission may be performed on a sidelink, an uplink and a downlink, and further it is beneficial for the first terminal device to achieve power saving.

Optionally, in an implementation of the present application, the case where there is a conflict between the sidelink communication between the first terminal device and the second terminal device, and the cellular communication between the first terminal device and the first network device, includes: a conflict between sidelink reception and downlink reception, and/or a conflict between sidelink transmission and uplink transmission, and/or a conflict between sidelink reception and uplink transmission.

For example, there is a conflict between sidelink reception and downlink reception in a case of reusing reception capabilities on a sidelink, and an uplink and a downlink.

For another example, there is a conflict between sidelink transmission and uplink transmission in a case of reusing transmission capabilities on a sidelink, and an uplink and a downlink.

Optionally, the sidelink between the first terminal device and the second terminal device may be a unicast link, and the sidelink between the first terminal device and the second terminal device may be one link among multicast links.

Optionally, in an implementation of the present application, the first priority order is preconfigured by the first network device, or preset, or agreed in a protocol.

Optionally, in an implementation of the present application, the first terminal device is configured to perform sidelink communication with the second terminal device on a first time domain resource, and the first terminal device is configured to perform cellular communication with the first network device on a second time domain resource.

It should be noted that the second terminal device may perform sidelink communication with the first terminal device on the first time domain resource, and the second terminal device may perform cellular communication with a second network device on the second time domain resource or on another resource other than the second time domain resource.

Optionally, the first time domain resource and/or the second time domain resource are discontinuous resources in a time domain. That is, the first terminal device may perform discontinuous sidelink communication with the second terminal device on the first time domain resource, and the first terminal device may simultaneously perform discontinuous cellular communication with the first network device on the second time domain resource.

Optionally, in an implementation of the present application, the first time domain resource satisfies at least one of the following conditions: the first time domain resource is limited to be used for a first logical channel or a logical channel group on a sidelink between the first terminal device and the second terminal device; the first time domain resource is limited to be used for a first propagation mode; the first time domain resource is limited to be used for a case that a sidelink between the first terminal device and the second terminal device has not been established; or the first time domain resource is limited to be used for a case that a sidelink between the first terminal device and the second terminal device has been established.

Optionally, the first logical channel or logical channel group is a logical channel or logical channel group carrying a signaling, or is a logical channel or logical channel group carrying data.

Optionally, the signaling is a sidelink RRC signaling or a sidelink PC5 signaling (PC5-S).

For example, in the case that the sidelink between the first terminal device and the second terminal device has not been established, the first logical channel or logical channel group is a logical channel or logical channel group carrying a signaling.

For another example, in the case that the sidelink between the first terminal device and the second terminal device has been established, the first logical channel or logical channel group is a logical channel or logical channel group carrying data.

Optionally, the first propagation mode is broadcast, or the first propagation mode is unicast or multicast.

For example, in the case that the sidelink between the first terminal device and the second terminal device has not been established, the first propagation mode is broadcast.

For another example, in the case that a sidelink between the first terminal device and the second terminal device has been established, the first propagation mode is unicast or multicast.

Optionally, in an implementation of the present application, the second time domain resource is used for reception of a downlink paging message, and/or the second time domain resource is used for transmission of an uplink random access message.

Optionally, in an implementation of the present application, the first time domain resource and the second time domain resource may be configured by a network device through a system message, or may be configured by a network device through a downlink signaling.

For example, the first terminal device receives a first system message broadcast by the first network device, herein the first system message includes first indication information and second indication information. The first indication information is used for indicating the first time domain resource and the second indication information is used for indicating the second time domain resource.

For another example, the first terminal device receives a first system message and a second system message broadcast by the first network device, herein the first system message includes first indication information and the second system message includes second indication information. The first indication information is used for indicating the first time domain resource and the second indication information is used for indicating the second time domain resource.

For another example, the first terminal device receives a first downlink signaling sent by the first network device, herein the first downlink signaling includes first indication information and second indication information. The first indication information is used for indicating the first time domain resource and the second indication information is used for indicating the second time domain resource.

The first downlink signaling may be an RRC signaling, for example.

It should be noted that if the first terminal device is in an idle state, that is, an uplink and a downlink between the first terminal device and the first network device have not been established, the first network device may configure the first time domain resource and the second time domain resource by broadcast. If the first terminal device is in a connected state, that is, an uplink and a downlink between the first terminal device and the first network device have been established, the first network device may configure the first time domain resource and the second time domain resource by broadcast or by sending a downlink signaling.

Optionally, as Example One, the first terminal device receives the first information sent by the second terminal device, herein the first information is used for indicating a first resource and/or a second resource. The first resource is a resource used by the second terminal device for performing cellular communication and the second resource is a resource used by the second terminal device for performing sidelink communication with a third terminal device. The first terminal device performs sidelink communication with the second terminal device on a resource other than a resource indicated by the first information.

That is, the second terminal device may send to the first terminal device resource information used by the second terminal device for performing cellular communication and/or sidelink communication, so that when the first terminal device performs the sidelink communication with the second terminal device, this part of resource may be avoided, thereby reducing a conflict between the sidelink communication between the first terminal device and the second terminal device, and the cellular communication and/or the sidelink communication performed by the second terminal device, and further achieving power saving of the first terminal device and the second terminal device.

Further, in the Example One, the first terminal device sends second information to the second terminal device, wherein the second information is used for indicating resource information for the second terminal device to perform sidelink communication with the first terminal device. That is, after receiving the first information, the first terminal device may also indicate the resource information for the second terminal device to perform sidelink communication with the first terminal device, so that when the second terminal device performs the sidelink communication with the first terminal device, this part of resource may be avoided as much as possible, thereby reducing a conflict between the sidelink communication between the first terminal device and the second terminal device, and the cellular communication and/or the sidelink communication conducted by the second terminal device, thereby achieving power saving of the first terminal device and the second terminal device.

Optionally, the resource information of the sidelink communication indicated by the second information may be determined according to resource information of the cellular communication indicated by the first information.

Further, in the Example One, the resource information of the sidelink communication indicated by the second information is configured by the first network device.

Specifically, the first terminal device sends third information to the first network device, herein the third information is used for indicating a resource indicated by the first information. The first terminal device receives fourth information sent by the first network device, herein the fourth information is used for indicating the resource information used by the first terminal device and/or the second terminal device for the sidelink communication.

It should be noted that the first terminal device may determine the second information based on the fourth information. That is, a resource of the sidelink communication indicated by the second information may be configured by the first network device.

Optionally, the fourth information is also used for indicating resource information used by the first terminal device for downlink reception and/or uplink transmission.

Optionally, the resource information of the sidelink communication indicated by the fourth information may be determined according to the resource indicated by the third information.

Optionally, as Example Two, if a sidelink is established between the first terminal device and at least one terminal device, the at least one terminal device includes the second terminal device, and the first terminal device receives at least one piece of first information sent by the at least one terminal device respectively, herein the at least one piece of first information is used for indicating a resource used by the at least one terminal device corresponding to the at least one piece of first information for performing cellular communication. The first terminal device performs sidelink communication with the at least one terminal device on a resource other than the resource indicated by the at least one piece of first information.

That is, the Example Two is a multicast communication between the first terminal device and the at least one terminal device.

Further, in the Example Two, the first terminal device sends at least one piece of second information to the at least one terminal device respectively, herein the at least one piece of second information is used for indicating resource information for the at least one terminal device to perform sidelink communication with the first terminal device.

Furthermore, in the Example Two, the first terminal device sends fifth information to the first network device, herein the fifth information is used for indicating a resource indicated by the at least one piece of first information. The first terminal device receives sixth information sent by the first network device, herein the sixth information is used for indicating resource information for the at least one terminal device to perform sidelink communication with the first terminal device.

Optionally, the sixth information is also used for indicating resource information used by the first terminal device for downlink reception and/or uplink transmission.

Solutions in the wireless communication method 200 will be described in detail with reference to Implementations One to Four below.

Figure 5:
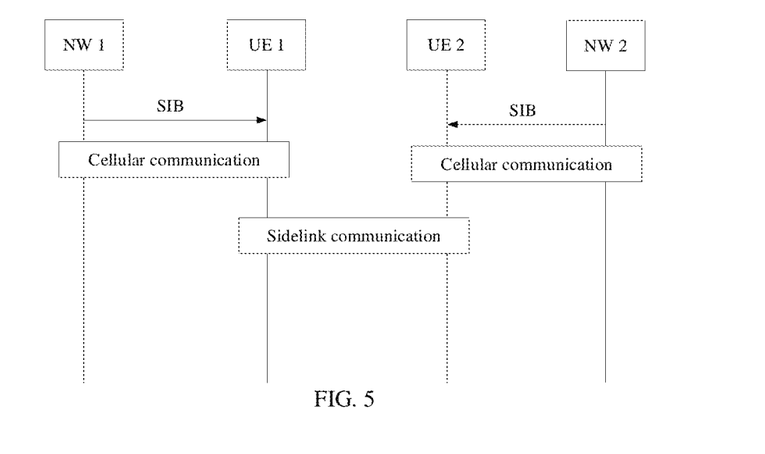
FIG. 5 is a schematic diagram of a wireless communication method according to an implementation of the present application.

In Implementation one, as shown in FIG. 5, a UE 1 may be the first terminal device described above, a Network (NW) 1 may be the first network device described above, a UE 2 may be the second terminal device described above, and a NW 2 may be the second network device described above. The UE 1 is in an RRC idle state, that is, a cellular network between the UE 1 and the NW 1 has not been established, and a sidelink between the UE 1 and the UE 2 has not been established. The UE 1 may obtain a first time domain resource and a second time domain resource by receiving a System Information Block (SIB) broadcast by the NW 1. The UE 1 may perform sidelink communication with the UE 2 on the first time domain resource, and the UE 1 may perform cellular communication with the NW 1 on the second time domain resource. When the sidelink communication and the cellular communication of the UE 1 conflicts with each other, the UE 1 may perform communication based on a first priority order.

It should be noted that, in the Implementation One, the UE 2 may also perform operations similar to those of the UE 1, so that when sidelink communication and cellular communication of the UE 2 conflicts with each other, the UE 2 may perform communication based on the first priority order.

Figure 6:
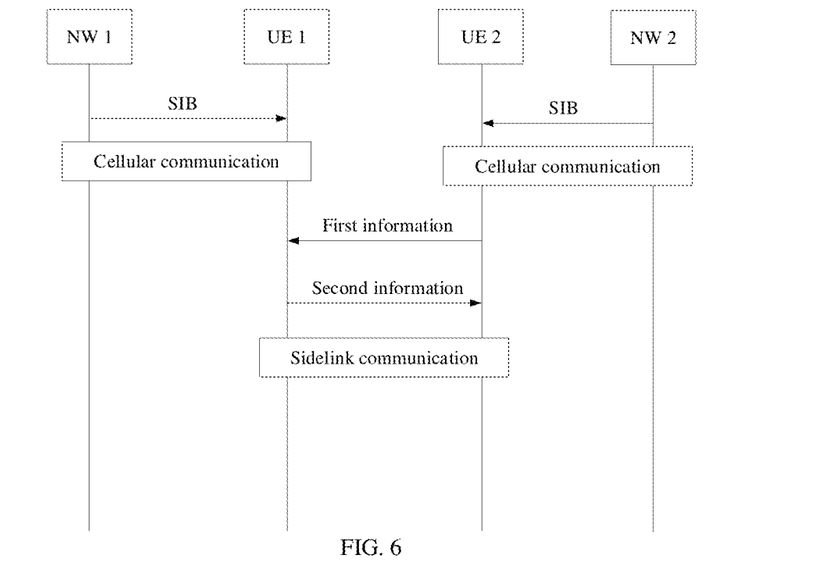
FIG. 6 is a schematic diagram of another wireless communication method according to an implementation of the present application.

In Implementation Two, as shown in FIG. 6, a UE 1 may be the first terminal device described above, a NW 1 may be the first network device described above, a UE 2 may be the second terminal device described above, and a NW 2 may be the second network device described above. The UE 1 is in an RRC idle state, that is, a cellular network between the UE 1 and the NW 1 has not been established, and a sidelink between the UE 1 and the UE 2 has been established. The UE 1 may obtain a first time domain resource and a second time domain resource by receiving a SIB broadcast by the NW 1. The UE 1 may perform sidelink communication with the UE 2 on the first time domain resource, and the UE 1 may perform cellular communication with the NW 1 on the second time domain resource. The UE 1 receives first information sent by the UE 2, herein the first information is used for indicating resource information used by the UE 2 for performing the cellular communication. The UE 1 sends second information to the UE 2, herein the second information is used for indicating resource information for the UE 2 to perform sidelink communication with the UE 1. When the sidelink communication and the cellular communication of the UE 1 conflicts with each other, the UE 1 may perform communication based on a first priority order.

It should be noted that if the UE 1 is a transmitting end device and the UE 2 is a receiving end device, the first information is specifically used for indicating resource-related information used by the UE 2 for downlink reception and/or uplink transmission, for example, resource information used for downlink paging reception, for another example, resource information used for uplink random access transmission. The second information is specifically used for indicating resource-related information for the UE 2 to perform sidelink reception with the UE 1. If the UE 1 is a receiving end device and the UE 2 is a transmitting end device, the first information is specifically used for indicating resource-related information used by the UE 2 for uplink transmission, for example, resource information used for uplink random access transmission. The second information is specifically used for indicating resource-related information for the UE 2 to perform sidelink transmission with the UE 1.

It should be noted that, in the Implementation Two, the UE 2 may also perform operations similar to those of UE 1, so that when the sidelink communication the cellular communication of the UE 2 conflicts with each other, the UE 2 may perform communication based on the first priority order.

Figure 7:
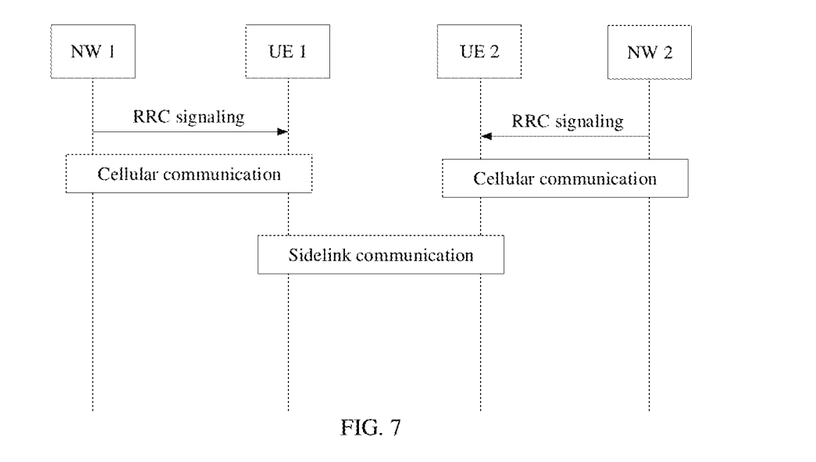
FIG. 7 is a schematic diagram of another wireless communication method according to an implementation of the present application.

In Implementation Three, as shown in FIG. 7, a UE 1 may be the first terminal device described above, a NW 1 may be the first network device described above, a UE 2 may be the second terminal device described above, and a NW 2 may be the second network device described above. The UE 1 is in an RRC connection state, that is, a cellular network between the UE 1 and the NW 1 has been established, and a sidelink between the UE 1 and the UE 2 has not been established. The UE 1 may obtain a first time domain resource and a second time domain resource by receiving an RRC signaling sent by the NW 1. The UE 1 may perform sidelink communication with the UE 2 on the first time domain resource, and the UE 1 may perform cellular communication with the NW 1 on the second time domain resource. When the sidelink communication and the cellular communication of the UE 1 conflicts with each other, the UE 1 may perform communication based on a first priority order.

It should be noted that, in the Implementation Three, the UE 2 may also perform operations similar to those of UE 1, so that when the sidelink communication and the cellular communication of the UE 2 conflicts with each other, the UE 2 may perform communication based on the first priority order.

Figure 8:
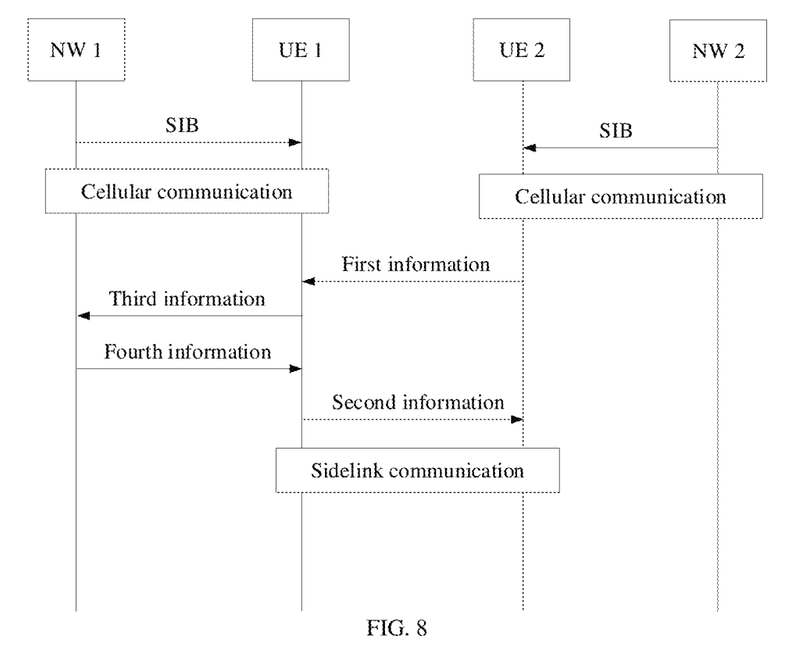
FIG. 8 is a schematic diagram of another wireless communication method according to an implementation of the present application.

In Implementation Four, as shown in FIG. 8, a UE 1 may be the first terminal device described above, a NW 1 may be the first network device described above, a UE 2 may be the second terminal device described above, and a NW 2 may be the second network device described above. The UE 1 is in an RRC connection state, that is, a cellular network between the UE 1 and the NW 1 has been established, and a sidelink between the UE 1 and the UE 2 has been established. The UE 1 may obtain a first time domain resource and a second time domain resource by receiving an RRC signaling sent by the NW 1. The UE 1 may perform sidelink communication with the UE 2 on the first time domain resource, and the UE 1 may perform cellular communication with the NW 1 on the second time domain resource. The UE 1 receives first information sent by the UE 2, herein the first information is used for indicating resource information used by the UE 2 for performing cellular communication. The UE 1 sends third information to the NW 1, herein the third information is used for indicating resource information used by the second terminal device for performing cellular communication. The UE 1 receives fourth information sent by the NW 1, herein the fourth information is used for indicating resource information used by the UE 1 and/or the UE 2 for performing sidelink communication. The UE 1 sends second information to the UE 2, wherein the second information is used for indicating resource information for the UE 2 to perform sidelink communication with the UE 1. When the sidelink communication and the cellular communication of the UE 1 conflicts with each other, the UE 1 may perform communication based on a first priority order.

Optionally, the fourth information is also used for indicating resource information used by the UE 1 for downlink reception and/or uplink transmission.

It should be noted that if the UE 1 is a transmitting end device and the UE 2 is a receiving end device, the first information and the third information are specifically used for indicating resource-related information used by the UE 2 for downlink reception and/or uplink transmission, for example, resource information used for downlink paging reception, for another example, resource information used for uplink random access transmission. The second information is specifically used for indicating resource-related information for the UE 2 to perform sidelink reception with the UE 1. If the UE 1 is a receiving end device and the UE 2 is a transmitting end device, the first information and the third information are specifically used for indicating resource-related information used by the UE 2 for uplink transmission, for example, resource information used for uplink random access transmission. The second information is specifically used for indicating resource-related information for the UE 2 to perform sidelink transmission with the UE 1.

It should be noted that, in the Implementation Four, the UE 2 may also perform operations similar to those of UE 1, so that when the sidelink communication and the cellular communication of the UE 2 conflicts with each other, the UE 2 may perform communication based on the first priority order.

A scenario described in the Implementation Two or the Implementation Four above is a scenario of unicast, and the Implementation Two or the Implementation Four is also applicable to a scenario of multicast.

Specifically, a sidelink is established between the UE 1 and at least one terminal device, the at least one terminal device includes the UE 2, and the UE 1 receives at least one piece of first information sent by the at least one terminal device respectively, herein the at least one piece of first information is used for indicating resource information used by the at least one terminal device corresponding to the at least one piece of first information for performing cellular communication. The UE 1 sends fifth information to the NW 1, herein the fifth information is used for indicating resource information used by the at least one terminal device for cellular communication. The UE 1 receives sixth information sent by the NW 1, herein the sixth information is used for indicating resource information for the at least one terminal device to perform sidelink communication with the UE 1. The UE 1 sends at least one piece of second information to the at least one terminal device respectively, herein the at least one piece of second information is used for indicating resource information for the at least one terminal device to perform sidelink communication with the UE 1. When the sidelink communication and the cellular communication of the UE 1 conflicts with each other, the UE 1 may perform communication based on a first priority order. Of course, the UE 2 may also perform operations similar to those of UE 1, so that when the sidelink communication and the cellular communication of the UE 2 conflicts with each other, the UE 2 may perform communication based on the first priority order.

Therefore, in an implementation of the present application, in a case that there is a conflict between the sidelink communication between the first terminal device and the second terminal device, and the cellular communication between the first terminal device and the first network device, the first terminal device performs communication according to the first priority order. Since the first priority order is determined according to service attributes, the first terminal device may flexibly select a service for transmission based on the service attributes, so that discontinuous transmission may be performed on a sidelink, an uplink and a downlink, which is beneficial to achieving power saving of the first terminal device.

It should be understood that related descriptions in the wireless communication method 200 and the wireless communication method 300 in the implementations of the present application may be referred to each other.

Figure 9:
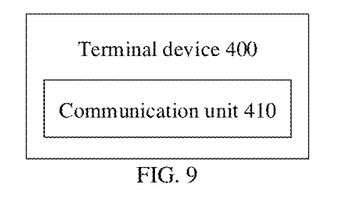
FIG. 9 is a schematic block diagram of a terminal device according to an implementation of the present application.

FIG. 9 is a schematic block diagram of a terminal device 400 according to an implementation of the present application. As shown in FIG. 9, the terminal device 400 is a first terminal device and includes: a communication unit 410 configured to receive first information sent by a second terminal device, herein the first information is used for indicating a first resource and/or a second resource, the first resource is a resource used by the second terminal device for performing cellular communication, and the second resource is a resource used by the second terminal device for performing sidelink communication with a third terminal device.

The communication unit 410 is further configured to perform sidelink communication with the second terminal device on a resource other than a resource indicated by the first information.

Optionally, the communication unit 410 is further configured to send second information to the second terminal device, herein the second information is used for indicating a resource for the second terminal device to perform sidelink communication with the first terminal device.

Optionally, the communication unit 410 is further configured to send third information to a first network device, herein the third information is used for indicating the resource indicated by the first information.

The communication unit 410 is further configured to receive fourth information sent by the first network device, herein the fourth information is used for indicating a resource used by the first terminal device and/or the second terminal device for performing sidelink communication.

Optionally, the fourth information is also used for indicating resource information used by the first terminal device for downlink reception and/or uplink transmission.

Optionally, the first terminal device is configured to perform sidelink communication with the second terminal device on a first time domain resource, and the first terminal device is configured to perform cellular communication with the first network device on a second time domain resource.

Optionally, the first time domain resource and/or the second time domain resource are discontinuous resources in a time domain.

Optionally, the first time domain resource satisfies at least one of the following conditions: the first time domain resource is limited to be used for a first logical channel or a logical channel group on a sidelink between the first terminal device and the second terminal device; the first time domain resource is limited to be used for a first propagation mode; the first time domain resource is limited to be used for a case where a sidelink between the first terminal device and the second terminal device has not been established; or the first time domain resource is limited to be used for a case where a sidelink between the first terminal device and the second terminal device has been established.

Optionally, the first logical channel or logical channel group is a logical channel or logical channel group carrying a signaling, or is a logical channel or logical channel group carrying data.

Optionally, the signaling is a sidelink RRC signaling or a sidelink PC5 signaling.

Optionally, the first propagation mode is broadcast, or the first propagation mode is unicast or multicast.

Optionally, the second time domain resource is used for reception of a downlink paging message, and/or the second time domain resource is used for transmission of an uplink random access message.

Optionally, the communication unit 410 is further configured to receive a first system message broadcast by the first network device, herein the first system message includes first indication information and second indication information. The first indication information is used for indicating the first time domain resource and the second indication information is used for indicating the second time domain resource.

Optionally, the communication unit 410 is further configured to receive a first system message and a second system message broadcast by the first network device, herein the first system message includes first indication information and the second system message includes second indication information. The first indication information is used for indicating the first time domain resource and the second indication information is used for indicating the second time domain resource.

Optionally, the communication unit 410 is further configured to receive a first downlink signaling sent by the first network device, herein the first downlink signaling includes first indication information and second indication information. The first indication information is used for indicating the first time domain resource and the second indication information is used for indicating the second time domain resource.

Optionally, the communication unit 410 is further configured to avoid performing sidelink communication with the second terminal device on a third resource, herein the third resource is a resource used by the first terminal device to perform sidelink communication with a fourth terminal device.

It should be understood that the terminal device 400 according to the implementation of the present application may correspond to the first terminal device in the method implementations of the present application, and the above-mentioned and other operations and/or functions of various units in the terminal device 400 are respectively for implementing corresponding processes of the first terminal device in the method 200 shown in FIG. 3, which will not be repeated here for brevity.

Figure 10:
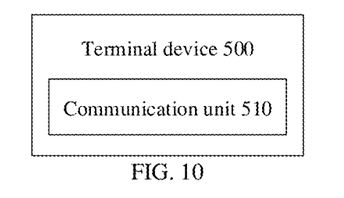
FIG. 10 is a schematic block diagram of another terminal device according to an implementation of the present application.

FIG. 10 is a schematic block diagram of a terminal device 500 according to an implementation of the present application. As shown in FIG. 10, the terminal device 500 is a first terminal device and includes: a communication unit 510, configured to perform communication according to a first priority order in a case that there is a conflict between sidelink communication between a first terminal device and a second terminal device, and cellular communication between the first terminal device and a first network device, herein the first priority order is determined according to service attributes and/or resource attributes.

Optionally, the first terminal device is configured to perform sidelink communication with the second terminal device on a first time domain resource, and the first terminal device is configured to perform cellular communication with the first network device on a second time domain resource.

Optionally, the first time domain resource and/or the second time domain resource are discontinuous resources in a time domain.

Optionally, the first time domain resource satisfies at least one of the following conditions: the first time domain resource is limited to be used for a first logical channel or a logical channel group on a sidelink between the first terminal device and the second terminal device; the first time domain resource is limited to be used for a first propagation mode; the first time domain resource is limited to be used for a case where a sidelink between the first terminal device and the second terminal device has not been established; or the first time domain resource is limited to be used for a case where a sidelink between the first terminal device and the second terminal device has been established.

Optionally, the first logical channel or logical channel group is a logical channel or logical channel group carrying a signaling, or is a logical channel or logical channel group carrying data.

Optionally, the signaling is a sidelink RRC signaling or a sidelink PC5 signaling.

Optionally, the first propagation mode is broadcast, or the first propagation mode is unicast or multicast.

Optionally, the second time domain resource is used for reception of a downlink paging message, and/or the second time domain resource is used for transmission of an uplink random access message.

Optionally, the communication unit 510 is further configured to receive a first system message broadcast by the first network device, herein the first system message includes first indication information and second indication information. The first indication information is used for indicating the first time domain resource and the second indication information is used for indicating the second time domain resource.

Optionally, the communication unit 510 is further configured to receive a first system message and a second system message broadcast by the first network device, herein the first system message includes first indication information and the second system message includes second indication information. The first indication information is used for indicating the first time domain resource and the second indication information is used for indicating the second time domain resource.

Optionally, the communication unit 510 is further configured to receive a first downlink signaling sent by the first network device, herein the first downlink signaling includes first indication information and second indication information. The first indication information is used for indicating the first time domain resource and the second indication information is used for indicating the second time domain resource.

Optionally, the communication unit 510 is further configured to receive first information sent by the second terminal device, herein the first information is used for indicating a first resource and/or a second resource. The first resource is a resource used by the second terminal device for cellular communication and the second resource is a resource used by the second terminal device for sidelink communication with a third terminal device.

The communication unit 510 is further configured to perform sidelink communication with the second terminal device on a resource other than a resource indicated by the first information.

Optionally, the communication unit 510 is further configured to send second information to the second terminal device, herein the second information is used for indicating resource information for the second terminal device to perform sidelink communication with the first terminal device.

Optionally, the communication unit 510 is further configured to send third information to the first network device, herein the third information is used for indicating the resource indicated by the first information.

The communication unit 510 is further configured to receive fourth information sent by the first network device, herein the fourth information is used for indicating resource information used by the first terminal device and/or the second terminal device for sidelink communication.

Optionally, the fourth information is also used for indicating resource information used by the first terminal device for downlink reception and/or uplink transmission.

Optionally, if a sidelink is established between the first terminal device and at least one terminal device, the at least one terminal device includes the second terminal device.

The communication unit 510 is further configured to receive at least one piece of first information sent by the at least one terminal device, herein the at least one piece of first information is used for indicating a resource used by the at least one terminal device corresponding to the at least one piece of first information for cellular communication.

The communication unit 510 is further configured to perform sidelink communication with the at least one terminal device on a resource other than the resource indicated by the at least one piece of first information.

Optionally, the communication unit 510 is further configured to send at least one piece of second information to the at least one terminal device respectively, herein the at least one piece of second information is used for indicating resource information for the at least one terminal device to perform sidelink communication with the first terminal device.

Optionally, the communication unit 510 is further configured to send fifth information to the first network device, herein the fifth information is used for indicating resource information used by the at least one terminal device for cellular communication.

The communication unit 510 is further configured to receive sixth information sent by the first network device, herein the sixth information is used for indicating resource information for the at least one terminal device to perform sidelink communication with the first terminal device.

Optionally, the sixth information is also used for indicating resource information used by the first terminal device for downlink reception and/or uplink transmission.

Optionally, a case where there is a conflict between the sidelink communication between the first terminal device and the second terminal device, and the cellular communication between the first terminal device and the first network device includes: a conflict between sidelink reception and downlink reception, and/or a conflict between sidelink transmission and uplink transmission, and/or a conflict between sidelink reception and uplink transmission.

Optionally, the first priority order is preconfigured by the first network device, or preset, or agreed in a protocol.

It should be understood that the terminal device 500 according to the implementation of the present application may correspond to the first terminal device in the method implementations of the present application, and the above-mentioned and other operations and/or functions of various units in the terminal device 500 are respectively for implementing corresponding processes of the first terminal device in the method 300 shown in FIG. 4, which will not be repeated here for brevity.

Figure 11:
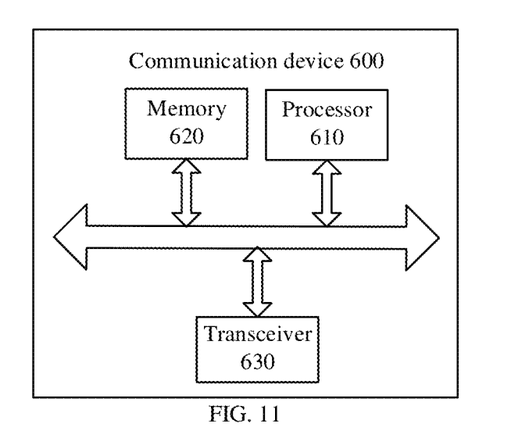
FIG. 11 is a schematic block diagram of a communication device according to an implementation of the present application.

FIG. 11 is a schematic diagram of a structure of a communication device 600 according to an implementation of the present application. The communication device 600 shown in FIG. 11 includes a processor 610, wherein the processor 610 may call and run a computer program from a memory to implement a method in an implementation of the present application.

Optionally, as shown in FIG. 11, the communication device 600 may further include a memory 620. Herein, the processor 610 may call and run a computer program from the memory 620 to implement a method in an implementation of the present application.

Herein, the memory 620 may be a separate device independent of the processor 610, or may be integrated in the processor 610.

Optionally, as shown in FIG. 11, the communication device 600 may further include a transceiver 630, and the processor 610 may control the transceiver 630 to communicate with another device. Specifically, the transceiver 630 may send information or data to another device or receive information or data sent by another device.

Herein, the transceiver 630 may include a transmitter and a receiver. The transceiver 630 may further include antennas, a quantity of which may be one or more.

Optionally, the communication device 600 may be specifically a network device of an implementation of the present application, and the communication device 600 may implement corresponding processes implemented by the first network device in various methods of the implementations of the present application, which will not be repeated here for brevity.

Optionally, the communication device 600 may be specifically a terminal device of an implementation of the present application, and the communication device 600 may implement corresponding processes implemented by the first terminal device in various methods of the implementations of the present application, which will not be repeated here for brevity.

Figure 12:
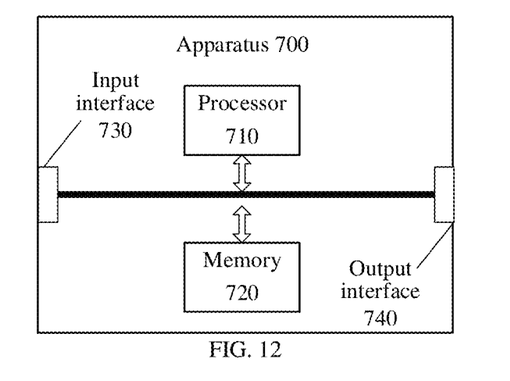
FIG. 12 is a schematic block diagram of an apparatus according to an implementation of the present application.

FIG. 12 is a schematic diagram of a structure of an apparatus according to an implementation of the present application. The apparatus 700 shown in FIG. 12 includes a processor 710. The processor 710 may call and run a computer program from a memory to implement a method in an implementation of the present application.

Optionally, as shown in FIG. 12, the apparatus 700 may further include a memory 720. Herein, the processor 710 may call and run a computer program from the memory 720 to implement a method in an implementation of the present application.

Herein, the memory 720 may be a separate device independent of the processor 710, or may be integrated in the processor 710.

Optionally, the apparatus 700 may further include an input interface 730. Herein, the processor 710 may control the input interface 730 to communicate with another device or chip. Specifically, the processor 710 may obtain information or data sent by another device or chip.

Optionally, the apparatus 700 may further include an output interface 740. Herein, the processor 710 may control the output interface 740 to communicate with another device or chip. Specifically, the processor 710 may output information or data to another device or chip.

Optionally, the apparatus may be applied to a network device in an implementation of the present application, and the apparatus may implement corresponding processes implemented by the first network device in various methods of the implementations of the present application, which will not be repeated here for brevity.

Optionally, the apparatus may be applied to a terminal device in an implementation of the present application, and the apparatus may implement corresponding processes implemented by the first terminal device in various methods of the implementations of the present application, which will not be repeated here for brevity.

Optionally, the apparatus mentioned in an implementation of the present application may also be a chip. For example, it may be a system-level chip, a system chip, a chip system, or a system on chip, etc.

Figure 13:
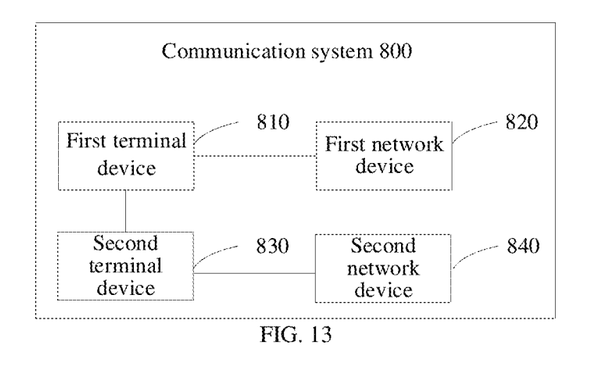
FIG. 13 is a schematic block diagram of a communication system according to an implementation of the present application.

FIG. 13 is a schematic block diagram of a communication system 800 according to an implementation of the present application. As shown in FIG. 13, the communication system 800 may include a first terminal device 810, a first network device 820, a second terminal device 830, and a second network device 840.

The first terminal device 810 may be configured to implement corresponding functions implemented by the first terminal device in the above methods, and the first network device 820 may be configured to implement corresponding functions implemented by the first network device in the above methods. The first terminal device 810 communicates with the second terminal device 830 through a sidelink, and the second terminal device 830 may be configured to implement corresponding functions implemented by the second terminal device in the above methods, and the second network device 840 may be configured to implement corresponding functions implemented by the second network device in the above methods, which will not be repeated here for brevity.

It should be understood that the processor in the implementations of the present application may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement various methods, acts, and logic block diagrams disclosed in the implementations of the present application. The general purpose processor may be a microprocessor or the processor may be any conventional processor or the like. The acts of the methods disclosed in connection with the implementations of the present application may be directly embodied by execution of a hardware decoding processor, or by execution of a combination of hardware and software modules in a decoding processor. The software modules may be located in a storage medium mature in the field, such as a Random Access Memory, a flash memory, a Read-Only Memory, a Programmable Read-Only Memory, or an electrically erasable programmable memory, or a register. The storage medium is located in a memory, and a processor reads information in the memory and completes the acts of the above methods in combination with its hardware.

It should be understood that the memory in the implementations of the present application may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a restriction, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limitations. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memories in the implementations of the present application are intended to include, but are not limited to, these and any other suitable types of memories.

An implementation of the present application further provides a computer readable storage medium configured to store a computer program.

Optionally, the computer readable storage medium may be applied to a network device in an implementation of the present application, and the computer program enables a computer to perform the corresponding processes implemented by the network device in various methods according to the implementations of the present application, which will not be repeated here for brevity.

Optionally, the computer readable storage medium may be applied to a terminal device in an implementation of the present application, and the computer program enables a computer to perform corresponding processes implemented by the first terminal device in various methods of the implementations of the present application, which will not be repeated here for brevity.

An implementation of the present application further provides a computer program product, including computer program instructions.

Optionally, the computer program product may be applied to a network device in an implementation of the present application, and the computer program instructions enable a computer to perform the corresponding processes implemented by the network device in various methods according to the implementations of the present application, which will not be repeated here for brevity.

Optionally, the computer program product may be applied to a terminal device in an implementation of the present application, and the computer program instructions enable a computer to perform corresponding processes implemented by the first terminal device in various methods of the implementations of the present application, which will not be repeated here for brevity.

An implementation of the present application further provides a computer program.

Optionally, the computer program may be applied to a network device in an implementation of the present application. When the computer program is run on a computer, the computer is enabled to perform the corresponding processes implemented by the network device in various methods according to the implementations of the present application, which will not be repeated here for brevity.

Optionally, the computer program may be applied to a terminal device in an implementation of the present application, and when the computer program is run on a computer, the computer is enabled to perform corresponding processes implemented by the first terminal device in various methods of the implementations of the present application, which will not be repeated here for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each particular application, but such implementation should not be considered to be beyond the scope of the present application.

Those skilled in the art may clearly understand that for convenience and conciseness of description, specific working processes of the systems, apparatuses, and units described above may refer to the corresponding processes in the aforementioned method implementations, and details will not be repeated here.

In several implementations according to the present application, it should be understood that the disclosed systems, apparatuses, and methods may be implemented in other ways. For example, the apparatus implementations described above are only illustrative, for another example, a division of the units is only a logical function division, and there may be other division manners in actual implementation. For example, multiple units or components may be combined or integrated into another system, or some features may be ignored or not executed. In addition, mutual coupling or direct coupling or communication connection shown or discussed may be indirect coupling or communication connection through some interfaces, apparatuses, or units, and may be in electrical, mechanical, or other forms.

The units described as separated components may or may not be physically separated, and components shown as units may or may not be physical units, i.e., they may be located in one place or may be distributed over multiple network units. Some or all of the units may be selected according to practical needs to achieve purposes of solutions of the implementations.

In addition, various functional units in various implementations of the present application may be integrated in one processing unit, or various units may be physically present separately, or two or more units may be integrated in one unit.

The functions may be stored in a computer readable storage medium if implemented in a form of a software functional unit and sold or used as a separate product. Regarding such understanding, the technical solution of the present application, in essence, or the part contributing to the prior art, or the part of the technical solution, may be embodied in a form of a software product, wherein the computer software product is stored in a storage medium, and includes several instructions for enabling a computer device (which may be a personal computer, a server, or a network device, or the like) to perform all or part of the acts of the methods described in various implementations of the present application. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application should be subject to the protection scope of the claims.

What is claimed is:

1. A method for wireless communication, comprising:
performing, by a first terminal device, communication according to a first priority order in a case where there is a conflict between sidelink communication between the first terminal device and a second terminal device, and cellular communication between the first terminal device and a first network device, wherein the first priority order is determined according to service attributes and/or resource attributes; wherein the first terminal device is configured to perform the sidelink communication with the second terminal device on a first time domain resource and the first terminal device is configured to perform the cellular communication with the first network device on a second time domain resource; wherein the method further comprises:
receiving, by the first terminal device, a first downlink signaling sent by the first network device, wherein the first downlink signaling comprises the first indication information and the second indication information, the first indication information is used for indicating the first time domain resource and the second indication information is used for indicating the second time domain resource; wherein the first time domain resource and the second time domain resource are discontinuous resources in a time domain.

2. The method of claim 1, wherein the first time domain resource satisfies at least one of following conditions:
the first time domain resource is limited to be used for a first propagation mode;
the first time domain resource is limited to be used for a case where the sidelink between the first terminal device and the second terminal device has not been established; or
the first time domain resource is limited to be used for a case where the sidelink between the first terminal device and the second terminal device has been established.

3. The method of claim 2, wherein the first propagation mode is broadcast, or the first propagation mode is unicast or multicast.

4. The method of claim 1, wherein the second time domain resource is used for performing reception of a downlink paging message, and/or the second time domain resource is used for performing transmission of an uplink random access message.

5. The method of claim 1, further comprising:
sending, by the first terminal device, second information to the second terminal device, wherein the second information is used for indicating a resource for the second terminal device to perform the sidelink communication with the first terminal device.

6. The method of claim 5, further comprising:
receiving, by the first terminal device, fourth information sent by the first network device, wherein the fourth information is used for indicating resource information used by the first terminal device and/or the second terminal device for performing the sidelink communication.

7. The method of claim 6, wherein the fourth information is further used for indicating resource information used by the first terminal device for performing downlink reception and/or uplink transmission.

8. The method of claim 1, wherein a case where there is a conflict between the sidelink communication between the first terminal device and the second terminal device, and the cellular communication between the first terminal device and the first network device, comprises:
a conflict between sidelink reception and downlink reception, and/or a conflict between sidelink transmission and uplink transmission, and/or a conflict between sidelink reception and uplink transmission.

9. The method of claim 1, wherein the first priority order is preconfigured by the first network device, or preset, or agreed in a protocol.

10. A terminal device, wherein the terminal device is a first terminal device, and the terminal device comprises a processor and a transceiver, wherein:
the transceiver is configured to perform communication according to a first priority order in a case where there is a conflict between sidelink communication between the first terminal device and a second terminal device, and cellular communication between the first terminal device and a first network device, wherein the first priority order is determined according to service attributes and/or resource attributes; wherein the first terminal device is configured to perform the sidelink communication with the second terminal device on a first time domain resource and the first terminal device is configured to perform the cellular communication with the first network device on a second time domain resource; wherein the transceiver is further configured to receive a first downlink signaling sent by the first network device, wherein the first downlink signaling comprises the first indication information and the second indication information, the first indication information is used for indicating the first time domain resource and the second indication information is used for indicating the second time domain resource; wherein the first time domain resource and the second time domain resource are discontinuous resources in a time domain.

11. The terminal device of claim 10, wherein the first time domain resource satisfies at least one of following conditions:
the first time domain resource is limited to be used for a first propagation mode;
the first time domain resource is limited to be used for a case where the sidelink between the first terminal device and the second terminal device has not been established; or
the first time domain resource is limited to be used for a case where the sidelink between the first terminal device and the second terminal device has been established.

12. The terminal device of claim 11, wherein the first propagation mode is broadcast, or the first propagation mode is unicast or multicast.

13. The terminal device of claim 10, wherein the second time domain resource is used for performing reception of a downlink paging message, and/or the second time domain resource is used for performing transmission of an uplink random access message.

* * * * *